United States Patent [19]

Dziewolski

[11] Patent Number: 4,674,916
[45] Date of Patent: Jun. 23, 1987

[54] OFFSHORE PLATFORM DESIGNED IN PARTICULAR TO CONSTITUTE A PLEASURE CENTER

[76] Inventor: Richard Dziewolski, 8 Bis, rue Jules Ferry, 92100 Boulogne, France

[21] Appl. No.: 744,101

[22] Filed: Jun. 12, 1985

[30] Foreign Application Priority Data

Jun. 14, 1984 [FR] France ................................ 8409344

[51] Int. Cl.⁴ ...................... E02B 17/08; E02D 21/00
[52] U.S. Cl. .................................... 405/207; 405/195; 405/203
[58] Field of Search ............... 405/195, 196, 203–205, 405/207, 208, 210; 114/264, 265

[56] References Cited

U.S. PATENT DOCUMENTS

| | | | |
|---|---|---|---|
| 2,771,747 | 11/1956 | Rechtin | 405/208 |
| 3,528,254 | 9/1970 | Graham | 405/204 |
| 3,738,113 | 6/1973 | Madary et al. | |
| 3,886,753 | 6/1975 | Birdy et al. | 405/207 |
| 3,990,254 | 11/1976 | Mo | 405/203 |
| 4,002,038 | 1/1977 | Phares et al. | 405/203 X |
| 4,126,011 | 11/1978 | Lamy et al. | 405/196 |
| 4,142,819 | 3/1979 | Challine et al. | 405/196 |
| 4,293,240 | 10/1981 | Ogimoto et al. | 405/204 X |
| 4,497,594 | 2/1985 | Fern | 405/203 X |

FOREIGN PATENT DOCUMENTS

| | | |
|---|---|---|
| 2457536 A1 | 6/1976 | Fed. Rep. of Germany . |
| 2629787 | 1/1978 | Fed. Rep. of Germany . |
| 2716481 | 10/1978 | Fed. Rep. of Germany . |
| 2922715 A1 | 4/1981 | Fed. Rep. of Germany . |
| 2282021 | 3/1976 | France . |
| 2337793 | 8/1977 | France . |
| 2343863 | 10/1977 | France ................................ 405/204 |
| 2408511 | 6/1979 | France . |
| 802944 | 10/1980 | Norway . |
| 1431670 | 4/1976 | United Kingdom ................ 405/195 |

Primary Examiner—Cornelius J. Husar
Assistant Examiner—Nancy J. Stodola
Attorney, Agent, or Firm—Willian Brinks Olds Hofer Gilson & Lione Ltd.

[57] ABSTRACT

A platform for use as an artifical island wherein the platform comprises an immersed base of floats, vertical pillars and an emerged structure supported by said pillars. The floating base is formed by a disk of caissons. The vertical pillars are imbedded in the caissons and form the generating lines of a cylinder of substantially circular base. The emerged structure comprises a lower disk-shaped part traversed by the pillars, and an upper part comprised of modules which are joinable together to form a cylindrical assembly resting on the pillars. The floating disk may be dimensioned in relation to the platform and to the marine characteristics so as to offer low draft and high stability. Such dimensioning enables the platform to be entirely constructed in a shipyard and subsequently towed to the installation site.

17 Claims, 2 Drawing Figures

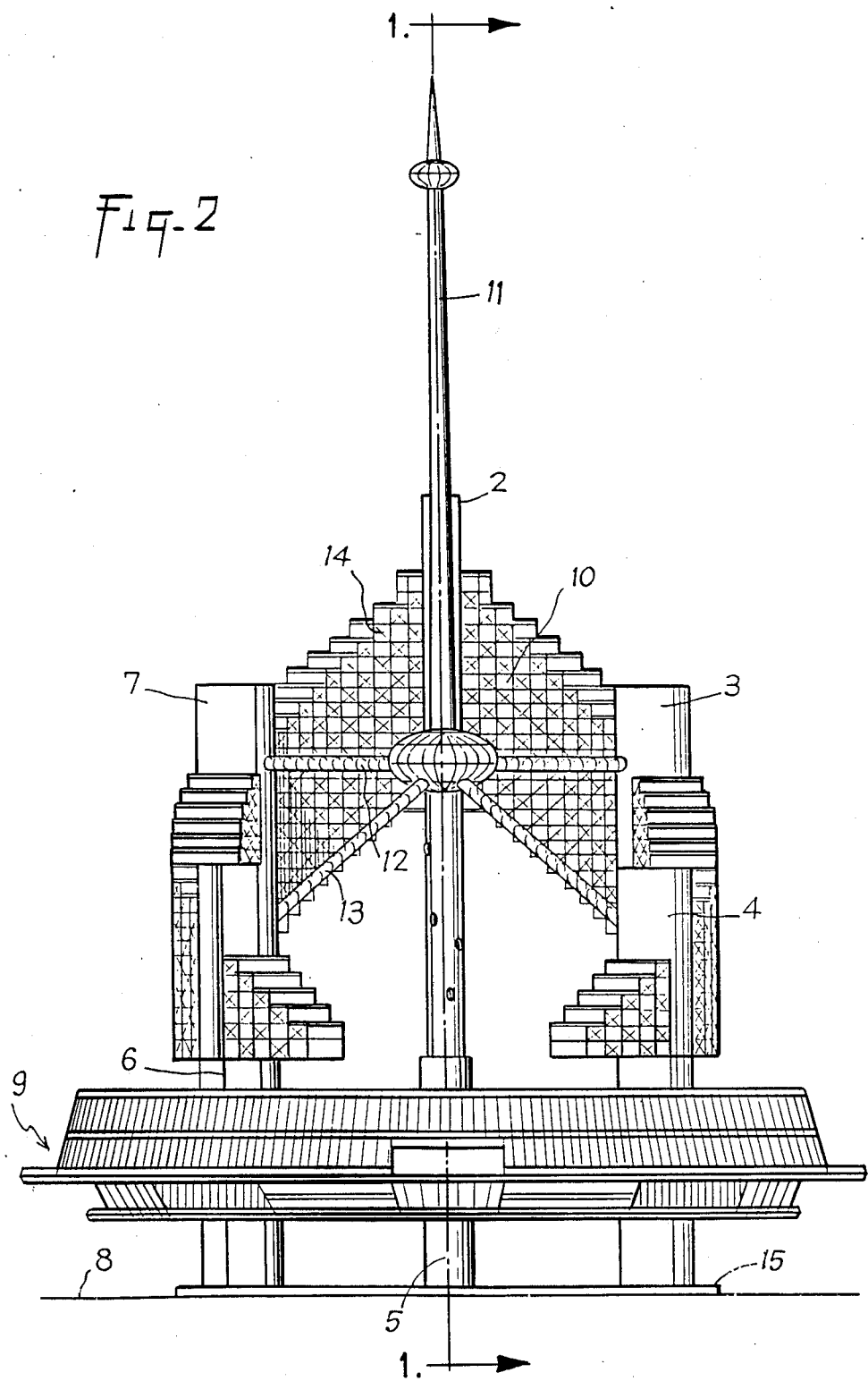

OFFSHORE PLATFORM DESIGNED IN PARTICULAR TO CONSTITUTE A PLEASURE CENTER

The present invention relates to a platform designed to form an artificial island to be used, in a preferred application, as a pleasure center implanted in the sea or like environment (lake, marshland, etc. . . . )

Platforms are already known, which are generally used for drilling oil, and comprises an immersed base of floats, vertical pillars and an emerged structure supported by said pillars. And it is known (from French Patent No. 2 282 021, for example) that platforms can be built in shipyards and then towed to their installation site where they are implanted by progressively filling their ballasts. But up to now, only the lower part of the platform has been built in a shipyard: the upper part of the platform which contains the equipments and installations is fitted out on the spot, hence the heavy costs of construction and installation.

Also, the platforms known to-date, are mainly designed for technical purposes. And yet, in residential estate developments, it is found that building sites on coastlines are becoming a rarity and more and more expensive in some industrialized areas.

In natural touristic sites bordering the sea, individual constructions, or constructions spreading over several kilometers tend to eliminate green spaces and contribute to polluting the coastlines.

It is the object of the present invention to propose a novel platform structure with a selfcontained residential area, and which can be entirely built and equipped in a shipyard.

This object is reached according to the invention with a structure which is remarkable in that the floating base is formed by a disk of caissons on which are embedded the vertical pillars forming the generating lines of a cylinder of substantially circular base, and also in that the emerged structure comprises, on the one hand, a lower disk-shaped part traversed by the pillars, and an upper part composed of modules which are joinable together to form a cylindrical assembly resting on the pillars.

Advantageously, the disk of floats and the emerged disk have substantially the same extension.

Advantageously, the disk of floats and/or the emerged disk have a substantially circular outline.

Advantageously, the pillars contain vertical circulation means.

Advantageously, the disk of floats contains the heavy installations.

Advantageously, the disk of floats is dimensioned in relation to the platform and to the marine characteristics, in such a way as to offer low draft and great stability, permitting the entire construction of the platform in a shipyard and its subsequent towing to the installation site.

Advantageously, the platform further comprises cylindrically distributed pillars, with a central mast which can be used as crane support, particularly for the construction of the cylindrical modular part of the emerged structure.

The platform is essentially intended for pleasure centers built near a coastline. It contains all the equipments and installations needed to make it self-sufficient: dwellings, offices, sparetime activities, shops, technical premises, production and storage of energy; production and storage of fresh water, etc.

The invention will be more readily understood on reading the following description with reference to the accompanying drawings, in which:

FIG. 2 is a front view of the emerged structure of the platform shown in FIG. 1.

Figure 1:
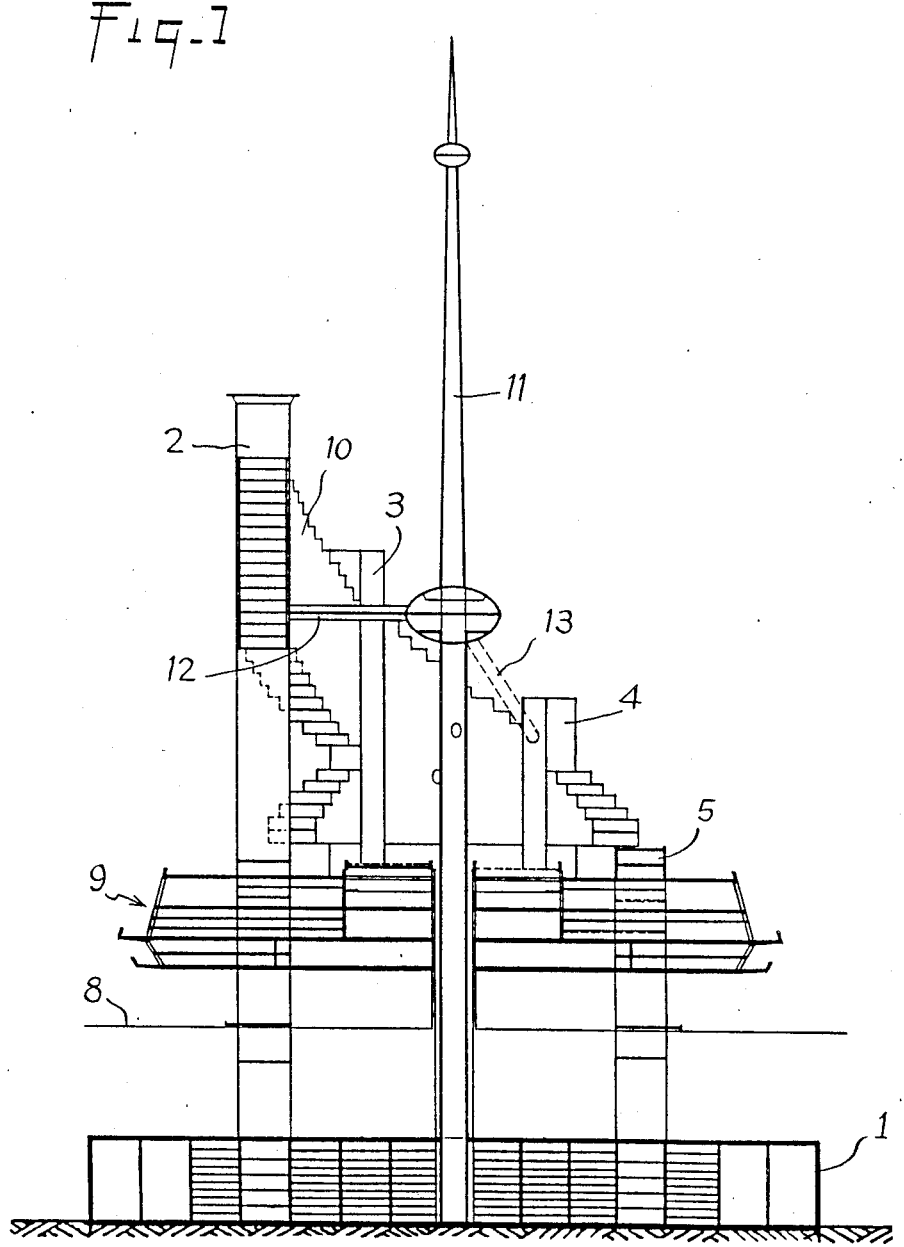
FIG. 1 is a lateral cross-section of the platform according to the invention.

The platform according to the invention comprises a circular disk 1, composed of floats, in which are anchored six pillars 2 to 7 regularly distributed into a circle.

The pillars project from the waterline, which is shown to be in average in 8, and support the emerged disk 9 by traversing it.

The upper part of the pillars, the length of which may be unequal to allow for certain architectural factors and/or factors such as periods of sunshine, winds, etc. . . . , is used for fastening the cylindrical modular structure 10.

A mast 11 is provided in the center of the structure.

The dimensions of the disk of floats 1, which is composed of caissons in reinforced concrete are calculated to allow the entire construction of the platform in a shipyard (hence a low draft, less than about fifteen metres), and the towing of the construction to its installation site in the best possible conditions of safety. According to a special embodiment of the invention, the disk is calculated to have a diameter of about 250 m and a thickness of 30 m (the height of the pillar 2 being in the illustrated example: 270 m).

The float 1 contains all the technical installations necessary to make the platform self-sufficient: technical premises, seawater ballasts, storage reservoirs for hydrocarbons, production and storage of fresh water, treatment of domestic wastes, treatment of waste or sewage waters, production of electricity, shops, warehouses, vehicle parkings (for those cases where the platform is joined to the coast by a tunnel with access possibilities for motor-cars). The float 1 can also comprise atomic shelters for all members of staff living on the platform, with guaranteed protection against atomic radiations (water+concrete).

The circular disk shape of the float is advantageous in that is gives a maximum volume for a minimum developed surface (hence giving a minimum hold to the forces created by marine currents).

The installation of equipments inside a float which is already heavy because made of concrete, contributes to lowering the center of gravity of the platform, and thus to increasing its stability (hence the towing possibility and the possibility of building the platform in a shipyard).

The number and disposition of the pillars allow for the dimensions of the platform and for the distribution of the forces in the floating disk 1 and in the emerged disk 9, as well as for other parameters related to the architectural design or to norms and regulations such as the maximum distances to the emergency exits located in the pillars, etc.

The pillars 2 to 7 are preferably made up of steel tubular modules, which can be first assembled horizontally on the ground and then lifted up to be anchored into the floats 1. Said pillars are advantageously of rectangular cross-section, thus permitting a more rational utilization of their inside volume housing the vertical circulation means (lifts, etc. . . . ).

The central mast 11 is also built from assembled tubular elements. Its firmness, in spite of its great height, is achieved by way of a rigging and/or by crossbracings, housing horizontal circulation means 12 (pedestrian ways) and oblique circulation means (mechanical means) connecting the pillars to the mast.

An auxiliary use of the mast is as a support for the self-climbing crane boom which is used for lifting and mounting the modules of pillars 2 to 7, the modules of the emerged disk 9 and those of the cylindrical structure 10.

The mast 11 can be used as a lighthouse, as a transmitting-receiving aerial, and it can house various types of installations such as a panoramic restaurant, external and internal lifts, etc.

The emerged structure, comprised of a lower disk-shaped part 9 and an upper part 10 composed of modules, is supported by the vertical pillars 2–7.

The emerged disk 9, advantageously composed of an assembly of modules, offers a large inside volume for a small height and a small external surface: it can therefore contain a large number of installations in the lower part of the emerged structure and as a result, it also contributes to lowering the center of gravity of the whole assembly. In addition, by interconnecting the pillars, it plays a major part in rigidifying the whole structure, through the floors of its different levels (such as four levels for example). The emerged disk 9 is also supported by the mast 11 in order to reduce the floor areas between the supports.

The emerged disk 9 contains all the commercial and entertainment installations necessary to make the platform self-sufficient: shopping centers, exhibition halls, administrative offices, auditoriums, conference halls, casinos, restaurants, polyvalent sports halls, swimming pools, skating-rings, tennis courts, squash courts, etc.

The upper part 10 of the emerged structure is advantageously designed in the form of modular helical arches interconnected by external diagonals 14: this assembly presents an exceptional rigidity: its behaviour towards the horizontal dynamic forces of the wind is that of a cylindrical space structure of which all the elements participate to the drag, this therefore contributing to lightening the weight of the upper structure, for a given drag and housing volume, hence increasing the stability of the platform. The staggering of the different storeys of modules guarantees excellent sunshine. This part is essentially devoted to dwellings, hotels and offices.

The assembly may be completed with floating pontoons 15 which can be used to constitute marinas, and/or to be joined to the mainland by a bridge.

The underwater part may comprise an observation post for obserivng marine life.

The distance between the floats 1 and the disk 9 is dependent on a number of parameters: the water depth, the height of the waves and the tides, and the stability during towing and operational phases.

When the water is too deep (for example over 100 m) to allow the floats to rest on the seabed, it is possible to use an anchoring system with taut cables, such as described in French Patent No. 2 408 511.

What I claim is:

1. Platform designed to form an artificial island, of the type comprising an immersed base of floats, vertical pillars and an emerged structure supported by said pillars, wherein the floating base is formed by a disk of caissons in which are embedded the vertical pillars, the pillars arranged with respect to one another in a substantially cylindrical configuration of circular cross-section, and also in that the emerged structure comprises a lower disk-shaped part traversed by the pillars, and an upper part composed of modules which are joinable together to form a cylindrical assembly resting on the pillars.

2. Platform as claimed in claim 1, wherein the disk of floats defines a first surface area and the emerged disk defines a second surface area substantially equal to the first surface area.

3. Platform as claimed in claim 1, wherein at least one of (1) the disk of floats and (2) the emerged disk has a substantially circular outline.

4. Platform as claimed in claim 1, wherein the pillars comprise vertical transportation means and vertical passage means.

5. Platform as claimed in claim 1, wherein the disk of floats is adapted to function as a storage chamber.

6. Platform as claimed in claim 1, wherein the disk of floats is dimensioned in relation to the platform and to the marine characteristics, in such a way as to offer low draft and great stability, permitting the entire construction of the platform in a shipyard and its subsequent towing to the installation site.

7. Platform as claimed in claim 1, wherein said platform further comprises cylindrically distributed pillars, with a central mast which can be used as crane support, particularly for the construction of the cylindrical modular part of the emerged structure.

8. A platform designed to form an artificial island of the type located in a body of water, the platform comprising:
   a disk shaped base comprising a plurality of caissons;
   a plurality of pillars connected to the caissons and extending vertically therefrom, the pillars arranged with respect to one another such that each pillar is substantially equidistant from a central axis;
   a lower disk shaped structure connected to the pillars and through which the pillars pass; and
   an upper structure comprising a plurality of modules, each module connectable to at least one of (1) at least one pillar; and (2) at least one other module;
   the base, pillars, lower structure and upper structure cooperating such that the platform has a shallow draft and can be towed to a desired location.

9. The invention of claim 8 wherein the pillars extend in the vertical direction a substantially nonuniform distance.

10. The invention of claim 8 wherein the modules form a substantially cylindrical assembly.

11. The invention of claim 8 wherein the disk of floats, the lower structure and the upper structure have a substantially circular outline.

12. The invention of claim 8 wherein the pillars are spaced with respect to one another such that at least one module may be located substantially in between adjacent pillars.

13. The invention of claim 8 wherein the disk of floats is dimensioned in relation to the weight and dimensions of the lower and upper structure to have sufficiently low draft and stability to allow the platform to be constructed in a conventional shipyard and subsequently towed to a desired location.

14. A platform designed to form an artificial island of the type located in a body of water, the platform comprising:

a plurality of water tight chambers, the chambers arranged to form a disc shaped structure adapted for immersion;

a plurality of pillars secured to and supported by the chambers, each pillar extending in the vertical direction a selected distance and positioned a common selected distance from a central axis such that the pillars form the generating lines of a cylinder;

a first emerged structure supported by the pillars and arranged about the pillars to define a first surface;

a second emerged structure supported by the pillars and comprising a plurality of modules, each module connectable to at least one of (1) at least one pillar; and (2) at least one other module, the modules defining a second surface approximately equal in area to the first surface;

the plurality of chambers cooperating with the first and second emerged structures to support the first and second emerged structures and to have sufficient draft and stability characteristics to allow the platform to be constructed in relatively shallow waters and subsequently towed to a desired location for installation.

15. The invention of claim 14 wherein at least one of the pillars comprises a vertical transportation means.

16. The invention of claim 14 wherein at least one of the pillars comprises a vertical passage means.

17. The invention of claim 14 wherein at least one of the chambers is adapted to function as a storage chamber.

* * * * *

UNITED STATES PATENT AND TRADEMARK OFFICE
CERTIFICATE OF CORRECTION

PATENT NO. : 4,674,916
DATED : June 23, 1987
INVENTOR(S) : Richard Dziewolski

It is certified that error appears in the above-identified patent and that said Letters Patent is hereby corrected as shown below:

IN THE ABSTRACT

In the first line of the Abstract, please delete "artifical" and substitute therefor --artificial--.

IN THE SPECIFICATION

In column 1, line 38, please delete "on which" and substitute therefor --in which--;

In column 1, line 41, please delete "emgerged" and substitute therefor --emerged--;

In column 3, line 54, please delete "obserivng" and substitute therefor --observing--.

Signed and Sealed this

Seventeenth Day of May, 1988

*Attest:*

DONALD J. QUIGG

*Attesting Officer*  *Commissioner of Patents and Trademarks*